(12) United States Patent
Wang et al.

(10) Patent No.: US 8,447,752 B2
(45) Date of Patent: May 21, 2013

(54) IMAGE SEARCH BY INTERACTIVE SKETCHING AND TAGGING

(75) Inventors: Changhu Wang, Beijing (CN); Zhiwei Li, Beijing (CN); Lei Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 54 days.

(21) Appl. No.: 12/883,411

(22) Filed: Sep. 16, 2010

(65) Prior Publication Data
US 2012/0072410 A1    Mar. 22, 2012

(51) Int. Cl.
*G06F 17/30*    (2006.01)
(52) U.S. Cl.
USPC ........... 707/711; 707/830; 715/233; 382/175; 382/253
(58) Field of Classification Search
USPC ............. 707/711, 723, 736, 770, E17.001, 707/E17.008, E17.1, E17.049; 382/170, 115, 382/253, 224, 305; 715/233, 968
See application file for complete search history.

(56) References Cited

U.S. PATENT DOCUMENTS

| | | | |
|---|---|---|---|
| 5,982,369 A | 11/1999 | Sciammarella et al. | |
| 5,987,459 A * | 11/1999 | Swanson et al. | 707/999.003 |
| 6,246,804 B1 * | 6/2001 | Sato et al. | 382/284 |
| 6,519,584 B1 | 2/2003 | Tognazzini et al. | |
| 6,741,655 B1 * | 5/2004 | Chang et al. | 707/E17.02 |
| 6,745,183 B2 | 6/2004 | Nishioka et al. | |
| 7,215,832 B1 * | 5/2007 | Yamaguchi | 382/305 |
| 7,458,013 B2 * | 11/2008 | Fruchter et al. | 715/203 |
| 7,688,318 B2 | 3/2010 | O'Malley, III et al. | |
| 8,126,274 B2 * | 2/2012 | Li et al. | 382/224 |
| 2006/0285172 A1 * | 12/2006 | Hull et al. | 358/448 |
| 2007/0050411 A1 * | 3/2007 | Hull et al. | 707/104.1 |
| 2007/0071323 A1 * | 3/2007 | Kontsevich et al. | 382/190 |
| 2007/0133947 A1 * | 6/2007 | Armitage et al. | 386/95 |
| 2008/0082426 A1 * | 4/2008 | Gokturk et al. | 707/3 |
| 2008/0212899 A1 * | 9/2008 | Gokturk et al. | 382/305 |
| 2009/0324077 A1 * | 12/2009 | Wu et al. | 382/170 |
| 2011/0153633 A1 * | 6/2011 | Napper et al. | 707/758 |
| 2012/0054177 A1 * | 3/2012 | Wang et al. | 707/723 |
| 2012/0072410 A1 * | 3/2012 | Wang et al. | 707/711 |

FOREIGN PATENT DOCUMENTS

WO    WO2010055356 A1    5/2010

OTHER PUBLICATIONS

Robert Villa, Martin Halvey, Hideo Joho1, David Hannah, and Joemon M. Jose—"Can an Intermediary Collection Help Users Search Image Databases Without Annotations?"—JCDL'10, Jun. 21-25, 2010, Gold Coast, Queensland, Australia, ACM (pp. 303-312:1-10).*

Changhu Wang, Zhiwei Li, and Lei Zhang—"MindFinder: Image Search by Interactive Sketching and Tagging"—WWW 2010, Apr. 26-30, 2010, Raleigh, North Carolina, USA. ACM 978-1-60558-799-8/10/04. (pp. 1309-13012:1-4).*

(Continued)

*Primary Examiner* — Anh Ly
(74) *Attorney, Agent, or Firm* — Lee & Hayes, PLLC

(57) ABSTRACT

Sketch and tagging based image search may include receiving a sketch query input and identifying an object in a desired image. The object or objects of the sketch query may be tagged with a text, and searching performed based on the objects. Certain implementations include indexing patches of the images, where the patches represent the objects. Relevant images can be returned based on the index of the patches.

20 Claims, 13 Drawing Sheets

OTHER PUBLICATIONS

Cailiang Liu, Dong Wang, Xiaobing Liu, Changhu Wang, Lei Zhang, Bo Zhang—"Robust Semantic Sketch Based Specific Image Retrieval"—ICME 2010 IEEE, Jul. 19-23, 2010 (pp. 1-6:30-35).*

Xin-Jing Wang, Lei Zhang, Xirong Li, and Wei-Ying Ma—"Annotating Images by Mining Image Search Results"—IEEE Transactions on Pattern Analysis and Machine Intelligence, vol. 30, No. 11, Nov. 2008, (pp. 1919-1932:1-14).*

Yang Cao.Hai Wang. Changhu Wang, Zhiwei Li, Liqing Zhang, and Lei Zhang—"MindFinder: Interactive Sketch-based Image Search on Millions of Images"—Microsoft Research Asia,—MM'10, Oct. 25-29, 2010, Firenze, Italy, 2010 ACM (pp. 1-4:1605-1608).*

Niblack et al.—"The QBIC Project: Querying Images By Content Using Color, Texture, and Shape"—IBM Research Division, Almaden Research Center—Storage and Retrieval for Image and Video Databases—SPIE vol. 1908 (Jan. 31, 1993) (pp. 173-187).*

Yin Chan, Zhibin Lei, Daniel Lopresti and S.Y. Kung—"A Feature-Based Approach for Image Retrieval by Sketch"—Matsushita Information Technology Laboratory, Panasonic Technologies, Inc.—1997 CS.lehigh.edu (pp. 1-25).*

Chen, et al., "Sketch2Photo: Internet Image Montage", retrieved on Jun. 29, 2010 at <<http://cg.cs.tsinghua.edu.cn/papers/SiggraphAsia_2009_sketch2photo.pdf>>, ACM Transactions on Graphics, vol. 28, No. 5, Article 124, Dec. 2009, pp. 1-10.

Fass, et al., "PicturePiper: Using a re-configurable pipeline to find images on the Web", retrieved on Jun. 29, 2010 at <<http://citeseerx.ist.psu.edu/viewdoc/download?doi=10.1.1.123.7074&rep=rep1&type=pdf>>, ACM, Proceedings of Symposium on User Interface Software and Teohnology (UIST), San Diego, CA, 2000, pp. 51-61.

Jain, et al., "VES: An Environment for Visual Experiences", retrieved on Jun. 29, 2010 at <<http://ngs.ics.uci.edu/whitepapers/VES.pdf>>, White paper, Sep. 2006, pp. 1-36.

Kherfi, et al., "Image Retrieval From the World Wide Web: Issues, Techniques, and Systems", retrieved on Jun. 29, 2010 at <<http://twiki.di.uniroma1.it/pub/Estrinfo/Materiale/web_image_retrieval.pdf>>, ACM Computing Surveys, vol. 36, No. 1, Mar. 2004, pp. 35-67.

Tao, et al., "SkyFinder: Attribute-based Sky Image Search", retrieved on Jun. 29, 2010 at <<http://citeseerx.ist.psu.edu/viewdoc/download?doi=10.1.1.159.6475&rep=rep1&type=pdf>>, ACM, International Conference on Computer Graphics and Interactive Techniques, New Orleans, LA, 2009, pp. 1-5.

Upstill, "Consistency, Clarity and Control: Development of a new approach to WWWimage retrieval", retrieved on Jun. 29, 2010 at <<http://citeseerx.ist.psu.edu/viewdoc/download?doi=10.1.1.12.4621&rep=rep1&type=pdf>>, Australian National University, The Department of Computer Science, Bachelor of Information Teohnology Honours Thesis, Nov. 2000, pp. 1-146.

Wang, et al., "Color Structured Image Search", retrieved on Jun. 29, 2010 at <<http://research.microsoft.com/pubs/81527/TR-SearchByColor.pdf>>, Microsoft Corporation, Microsoft Reaearch, Technical Report MSR-TR-2009-82, Jul. 7, 2009, pp. 1-23.

Zhou, at al., "Relevance Feedback in Image Retrieval: A Comprehensive Review", retrieved on Jun. 29, 2010 at <<http://citeseerx.ist.psu.edu/viewdoc/download?doi=10.1.1.89.6025&rep=rep1&type=pdf>>, ACM Multimedia Systems Journal, vol. 8, No. 6, 2003, pp. 536-544.

Zinger, et al., "Clustering and semantically filtering web images to create a large-scale image ontology", retrieved on Jun. 29, 2010 at <<http://odur.let.rug.nl/zinger/spie_zinger.pdf>>, Society for Imaging Science and Technology / SPIE Symposium Electronic Imaging, San Jose, CA, 2006, pp. 1-9.

* cited by examiner

IMAGE SEARCH BY INTERACTIVE SKETCHING AND TAGGING

BACKGROUND

With the prevalence of digital imaging devices (e.g., digital cameras) and the Internet, effective and efficient image retrieval techniques have become more important in commercial and academic applications. With an ever increasing number of digital images being made available, there becomes an increasing need to effectively retrieve relevant digital images desired by a user.

Issues can exist with efficiently retrieving digital images. An issue is query formulation. In other words, how can an image retrieval system translate an implicit query formed in a user's mind? For example, the user may have a particular image in mind; however, there may not be an explicit way for the user to express such a thought or query through an image retrieval system. An explicit text query may not be sufficient for a user's implicit thought or query. Another issue can be query matching. Query matching involves finding relevant images that best fit an implicit or explicit query. For example, a user may desire to retrieve similar images that are based on the implicit query.

Typical query methods based on text or content may be insufficient to support a user query based on an implicit and complex scene. For example, a user may desire to search for image(s) that include a "couple by the sea at sunset with a mountain in the background." Current query search techniques can fall short of finding relevant images based on the user's thoughts.

Interactive query search techniques have been developed; however, such techniques may be one sided and only consider how to leverage users' efforts to catch their intentions, rather than to provide a way to allow users to express their queries by leveraging an available image database(s). Furthermore, such techniques may also use only one type of interaction. For example, certain relevance feedback approaches may only provide an interactive indication from users to tell whether retrieved image results are relevant or not.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations herein provide techniques for image querying by sketching and tagging query images at object level. In certain implementations, indexing techniques are provided to efficiently search images at similar positions.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Interactive Sketching and Tagging Search

The techniques described herein are generally directed towards techniques for sketch and tagged (text) searching of images. Some implementations employ sketching and tagging images at an object level (i.e., tagging particular objects of images). The query can be refined by interaction with a user and further refining the query. This can be performed through iterative queries through a user interface. In certain implementations, an index system can be provided that indexes images, and patches of images, based on their position.

One or more image databases are treated as a repository from which a user can search from and retrieve images that are relevant to the user's thought or implicit query. Such a thought or query can be further refined to achieve more relevant images. Multiple actions can be enabled for the user to flexibly provide queries in a bilateral interactive manner by leveraging the entire image database(s), including tagging, refining query by dragging and dropping objects from search results, as well as editing objects. After each action, the search results can be updated in real time to provide users updated images to further refine the query. In other words, updated images returned or retrieved, can be used in a successive query. In addition, the user is also able to tag images or portions (patches) of images with a text to further help in refining the image query or search.

In certain implementations, images can be indexed based on a positional system that provides or returns images based on the position of objects on the images. This can assist in real time interactions between the system and the user. Therefore, by tagging objects of images and placing the tagged objects in desired locations in a query panel of the user interface, similar images with like objects placed in the same or proximity position are returned.

Example Framework for Sketch and Tag Based Search

Figure 1:
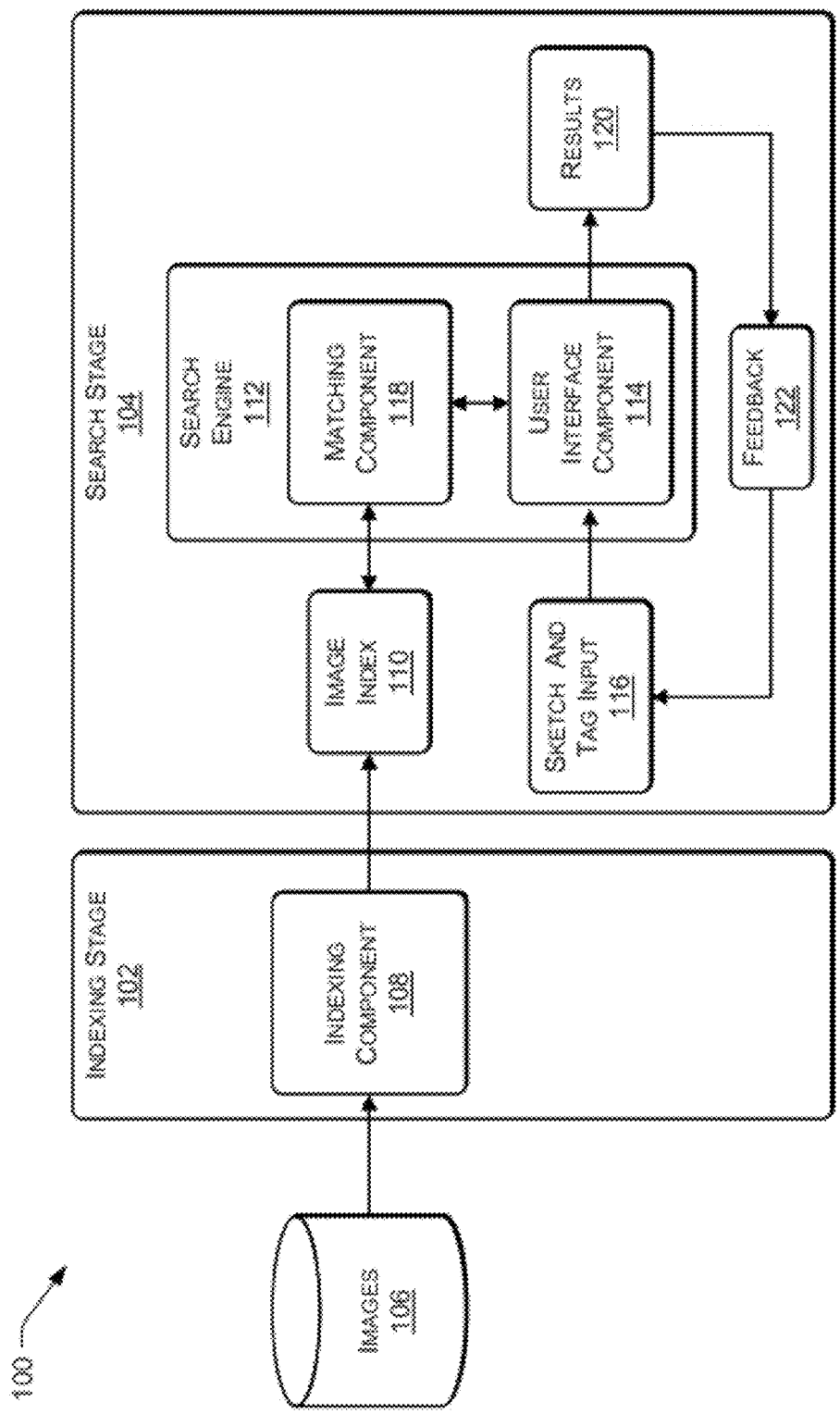
FIG. 1 is a block diagram of a framework for sketch and tagging based searching according to some implementations.

FIG. 1 is a block diagram of an example of an interactive sketch and tag based image search framework 100 according to some implementations herein. The framework 100 is capable of performing as a real time sketch and tag based interactive image search system for indexing and searching a multitude of images. The framework 100 may be part of or included in a self contained system (i.e., a computing device, such as a notebook or desktop computer) or a system that includes various computing devices and peripheral devices, such as a network system. It is also contemplated, that framework 100 may be part of a much larger system that includes the Internet and various area networks. The framework 100 may enable precise matching between an input sketch and tag query and one or more images in an image source, such as a database, the Internet, or the like. The framework 100 can include an offline or indexing stage 102 and an online or search stage 104. The indexing stage 102 can access one or more databases or sources of images 106. In certain implementations, indexing stage includes images 106.

For example, images 106 may be obtained from any suitable source, such as by crawling Internet websites, by downloading or uploading image databases, by storing images from imaging devices to computer storage media, and so forth. In some implementations, images 106 may be millions or even billions of images, photographs, or the like available on the World Wide Web. The indexing stage 102 also includes an indexing component 108 for generating an image index 110 of the images 106. Image index 110 may be a positional image index (further described below) for identifying one or more images based on object position. In some implementations, the indexing component 108 identifies position of objects in each of the images 106 and generates the image index 110 based on object position.

The image index 110 generated during the indexing stage 102 may be made available for use by a search engine 112 during the search stage 104. The search engine 112 may provide a user interface component 114 to be able to receive a sketch and tag input 116 submitted as a query. In the illustrated implementation, user interface component 114 is provided with search engine 112. For example, the user interface component 114 may be presented as a webpage to a user in a web browser window. In other implementations, the user interface component 114 may be incorporated into a web browser or other application on a user's computer, may be an add-in or upgrade to a web browser, etc. Search engine 112 also includes a matching component 118 configured to receive the sketch and tag input 116 and carry out a matching and ranking function for locating one or more images 106 that correspond to the sketch and tag input 116. In some implementations, the matching component 118 uses a query matching scheme based indexes of objects of images. The matching component 118 identifies one or more images corresponding to the sketch and tag input 116, and the user interface component 114 outputs one or more of the identified images as results 120. The results 120 may be displayed or otherwise provided as feedback 122 in real-time to the user. If the user is not satisfied with the results 120, the user may interactively and iteratively, modify the sketch and tag input 116 such as by adding additional objects or tags to a query panel (described below) of the user interface component 114.

Matching Techniques

By employing implementations of the sketch and tag based image search techniques disclosed herein, a user can simply sketch and/or tag one or more objects in a query page of the user interface to represent the contours object or a scene that is part of an image, and one or more relevant "matching" images are returned to the user. The "matching" images are identified based upon conditions of similarity to the sketched and tagged input, namely, similar shape, tagged identifier and similar position. Accordingly, it is desirable that the shape of the object or scene in the resulting image resembles the shape of the user's sketch input. In addition, the sketch can be a patch or portion of an image. Similar images are searched based on the patch or portion. Furthermore, it is desirable that the position of the matched object or scene in the resulting image is located at a similar position as in the input sketch.

Image Formed by User

Figure 2:
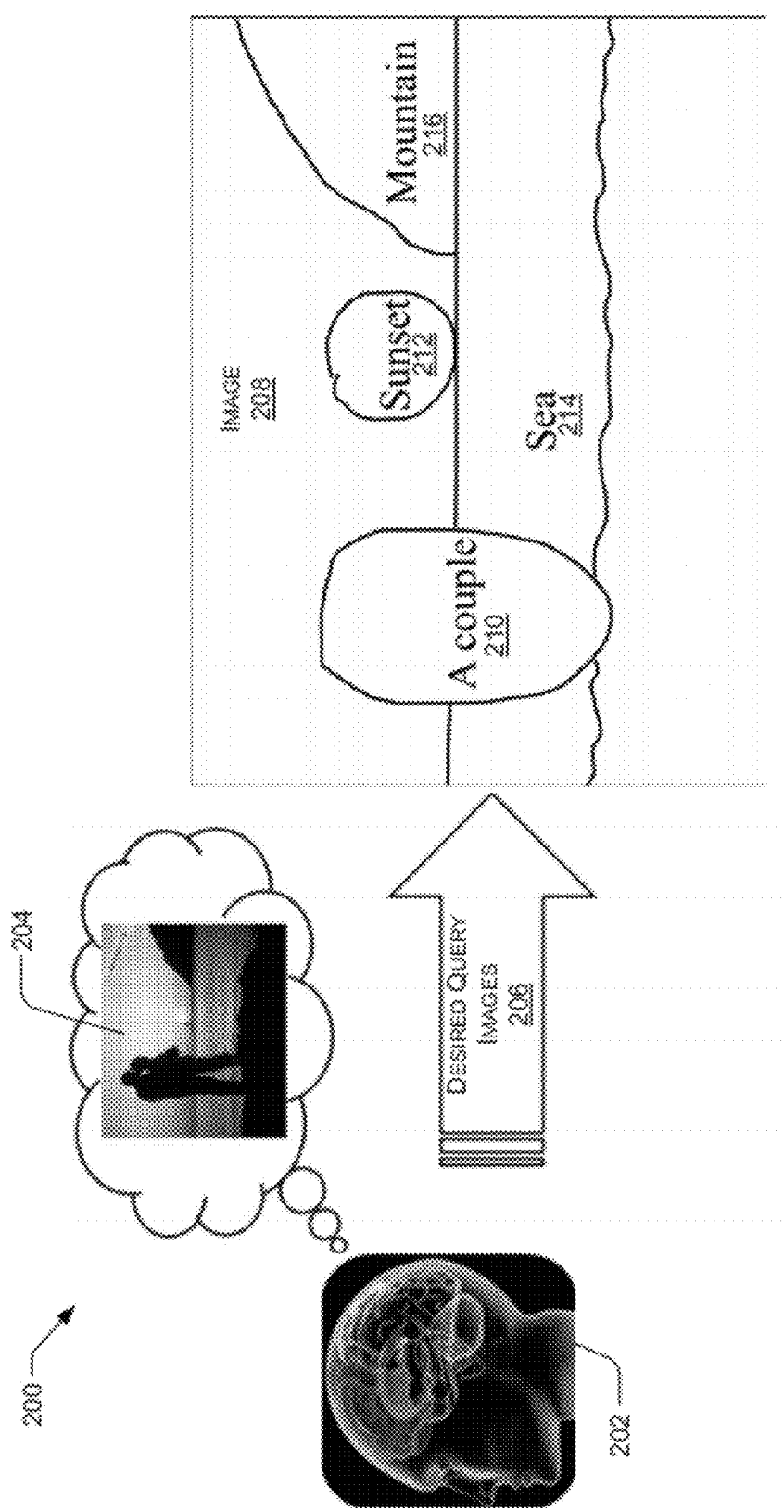
FIG. 2 is a block diagram of implicit user query, based on an image formed by the user according to some implementations.

FIG. 2 illustrates an implicit image search based on an image formed by a user. In particular, process 200 illustrates how an implicit image is searched based on an implicit query of a user 202. The user 202 has in mind, thoughts of an image 204. The user desires to search for, or query databases (e.g., images 106), as to images that are similar to image 204. The desired images 206 derived from image 204 of the user 202, include image(s) 208. Image(s) 208 will include at the least, objects that are significant to the user 202. In this case, the significant objects are a couple 210, a sunset 212, sea or beach 214 and a mountain. The objects 210-214 are also positioned where the user imagines them to be on image(s) 208. Therefore, even if an image includes all the objects 210-214, the objects 210-214 may not be in the position that the user imagines them to be. Such images are not returned to the user. Only images that have particular objects at particular positions/locations are returned.

Actions on User Interface

The user interface component 114 can provide a user interface that allows a user to input image queries, and return relevant images from images 106. Different query actions can take place on the user interface. Examples of such query actions and sequences of actions are now described.

Figure 3:
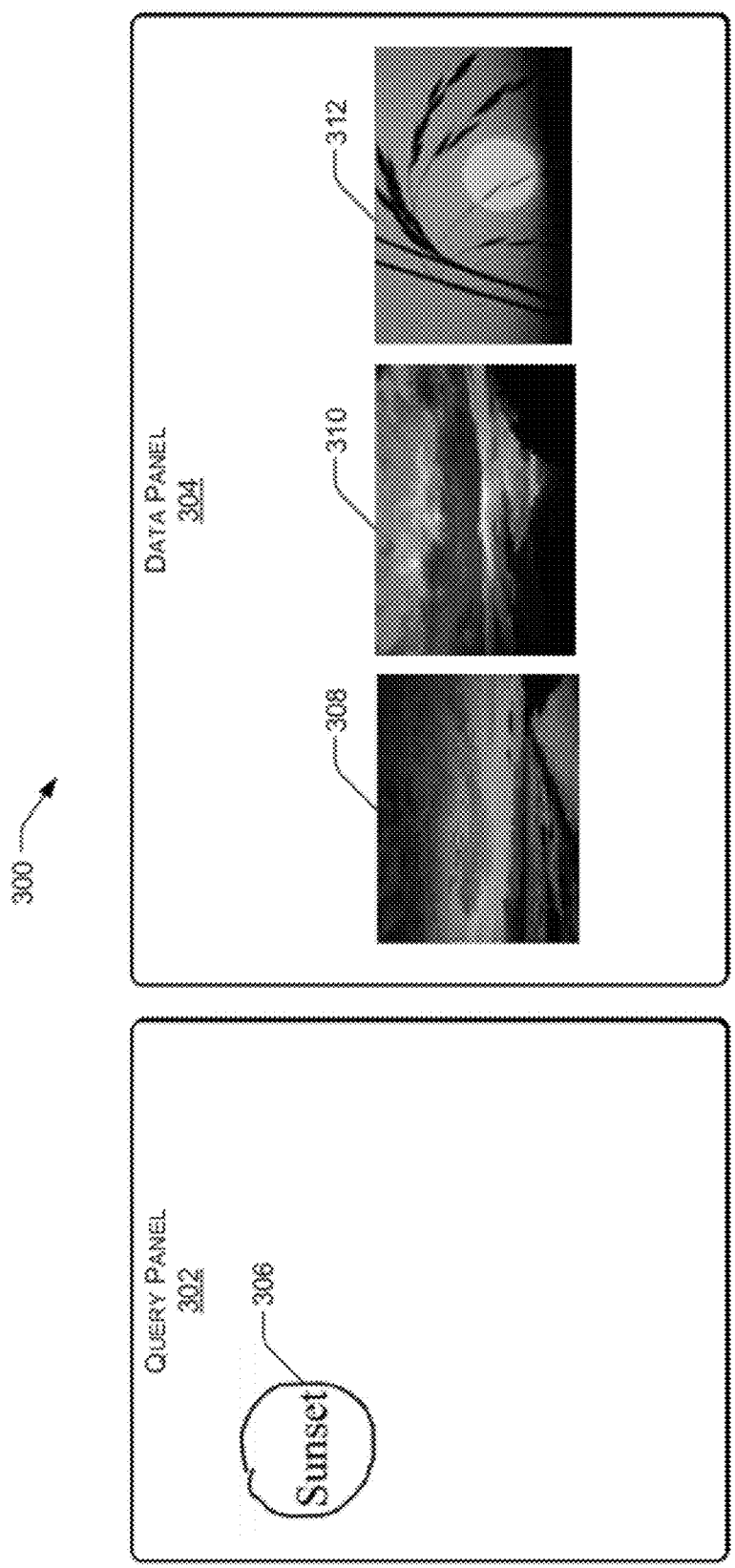
FIG. 3 depicts an example of a user interface with sketch and tagged text input, and retrieved image results according to some implementations.

FIG. 3 illustrates an example of a user interface with sketch and tagged text input, and retrieved image results. A user interface 300 is presented. The user interface 300 may be provided by the interface component 114.

The user interface 300 presents a query panel 302 and data panel 304 to a user. The query panel 302 allows the user to enter objects. The objects may be entered into the query panel 302, for example, by sketching, cutting and pasting from other images, or by other ways. In addition, objects that are entered in query panel 302 or available (shown) in query panel 302, can be tagged by the user. The tagging includes adding text to the objects. A user pointing and selecting device, such as a mouse can be implemented to allow the user to enter and modify objects on query panel 302. Text and tagging can be performed through a user data entry device, such as keyboard. In this example, an object 306 is sketched and tagged with "Sunset."

In certain implementations, the user interface can include a toolbar (not shown) and can include a variety of tools for submitting queries, for example a draw tool, an erase tool, a text tool, a color tool, and a reset button (not shown). For example, the user may select the draw tool and use a mouse pointer to draw one or more lines or curves on the query panel 302 as a sketch query input. The user may then click outside the input interface 300, such as anywhere in the query panel to submit a sketch query. Alternatively, rather than using a mouse pointer, in some implementations in which a touch screen is available to the user, the user may use a finger tip or stylus in place of a mouse for carrying out any of the interactions with the user interface 300 described herein. Additionally, the user may use the erase tool to erase a portion of a drawn sketch. The text tool may be used to open a text block window for text tagging objects and submitting a text query along with a sketch query. The color tool may be used to open the color wheel for selecting a color to be submitted with the sketch query, and the reset button may be selected to reset the query panel to the default ready position for receiving new input.

The user interface 300 includes and presents a data panel 304 to the user. The data panel 304 provides and presents images to the user of retrieved images based on the query of the user. In this example, images 308, 310 and 312 are shown; however, the number of images and how the images are presented can vary with different implementations. For example, the data panel 304 may display a plurality of images arranged in one or more rows of images, or image thumbnails, and as one or more pages that may be browsed through by the user, with the number of images being returned in one page being dependent on the displayed size of the image. Furthermore, image ranking may be used. Typically the highest-ranked images are represented first in order of rank from left to right. In some implementations, the user may drag one of the images from the results window into the query window to view an enlarged view of the image. To aid user navigation, the data panel 304 may include a page indicator; and a page forward and page back control.

In this example illustrated by FIG. 3, actions are provided to a user to allow tagging and text based image search. For example, a user can draw a curve. It is to be noted that such a curve may not necessarily be closed. In other words, the curve can be inferred to be closed. In this example, the curve is that of object 306. The user can tag the curve or object 306, with text. The tag "Sunset" is associated with the curve or object 306. The system returns images related to "Sunset" and are displayed in data panel 302 to the user. In this instance or stage, a text based image search technique is used.

Figure 4:
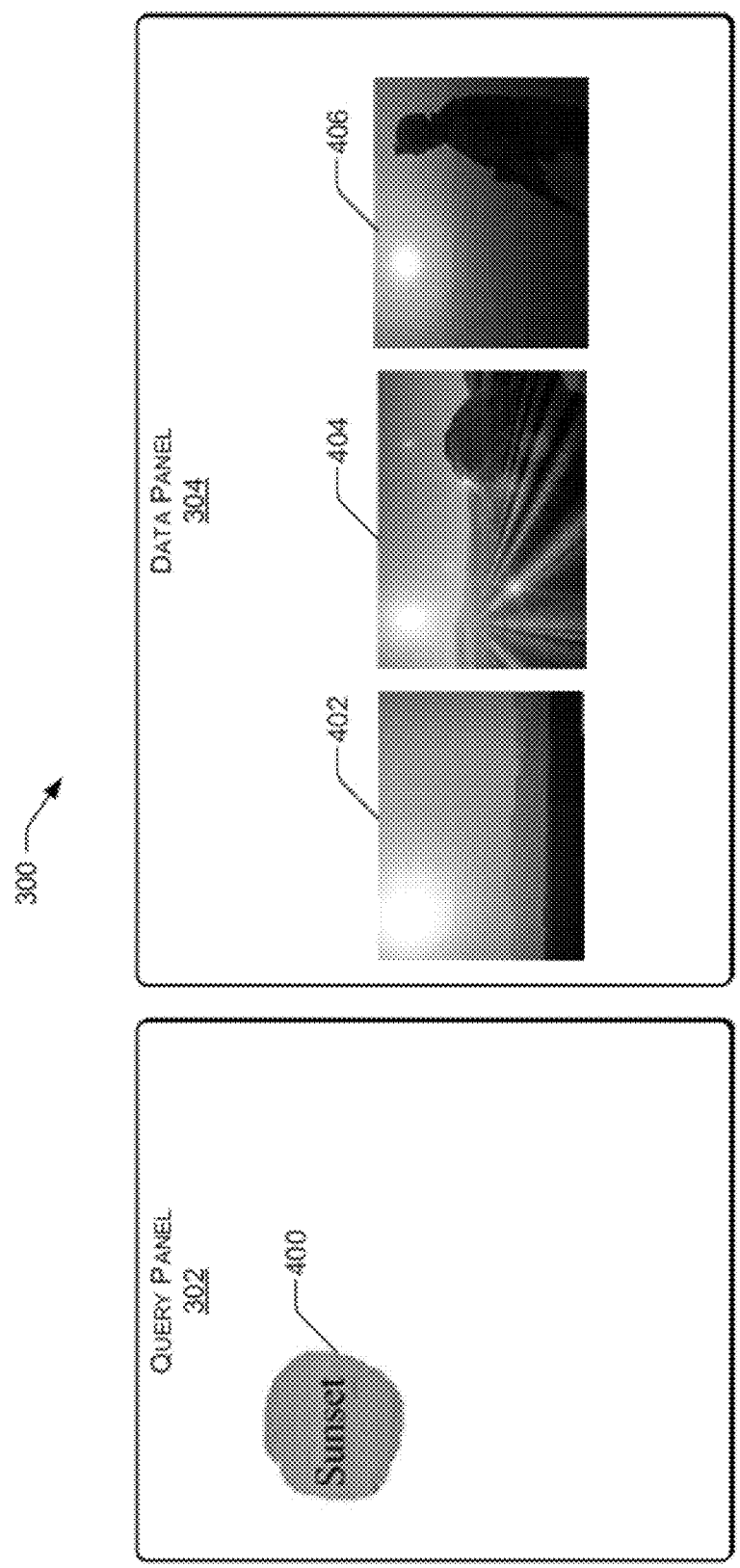
FIG. 4 depicts an example of a user interface with object drag-drop and object-based image search input, and retrieved image results according to some implementations.

FIG. 4 illustrates an example of a user interface with object drag-drop and object-based image search input, and retrieved image results. The actions described by FIG. 4, can follow the actions described by FIG. 3. In certain cases, the actions described in FIGS. 3-7 can proceed or succeed actions in any of the FIGS. 3-7. In other words, there is no particular order in which the actions follow one another, as described in the exemplarily user interface 300. The description herein, of the different actions performed at the user interface 300, is meant to be an example.

In this example, the user may find an interesting example of an object from images previously presented on the data panel 304, such as from images 308, 310, and 312. The user may draw a curve around a "sun" in one of the images, and drag this selected region or object, into the previous region or object curve tagged with "Sunset". The size of the selected object can automatically scale up or down to fit for the size of the region containing the tag "Sunset." The new or updated object in query panel 302 is shown as object 400. In return, the system can update the data panel 304 with new images, for example images 402, 404, and 406. The returned images 402, 404, and 406 are selected according to both the visual similarities between images in database(s) images 106 and the sun object 400 in the query panel 302, as well as the distance between the spatial position of the "sun" in images of database(s) images 106 and the sun object 400 in the query panel 302. Spatial position can be related to the positional indexing that is described below.

Figure 5:
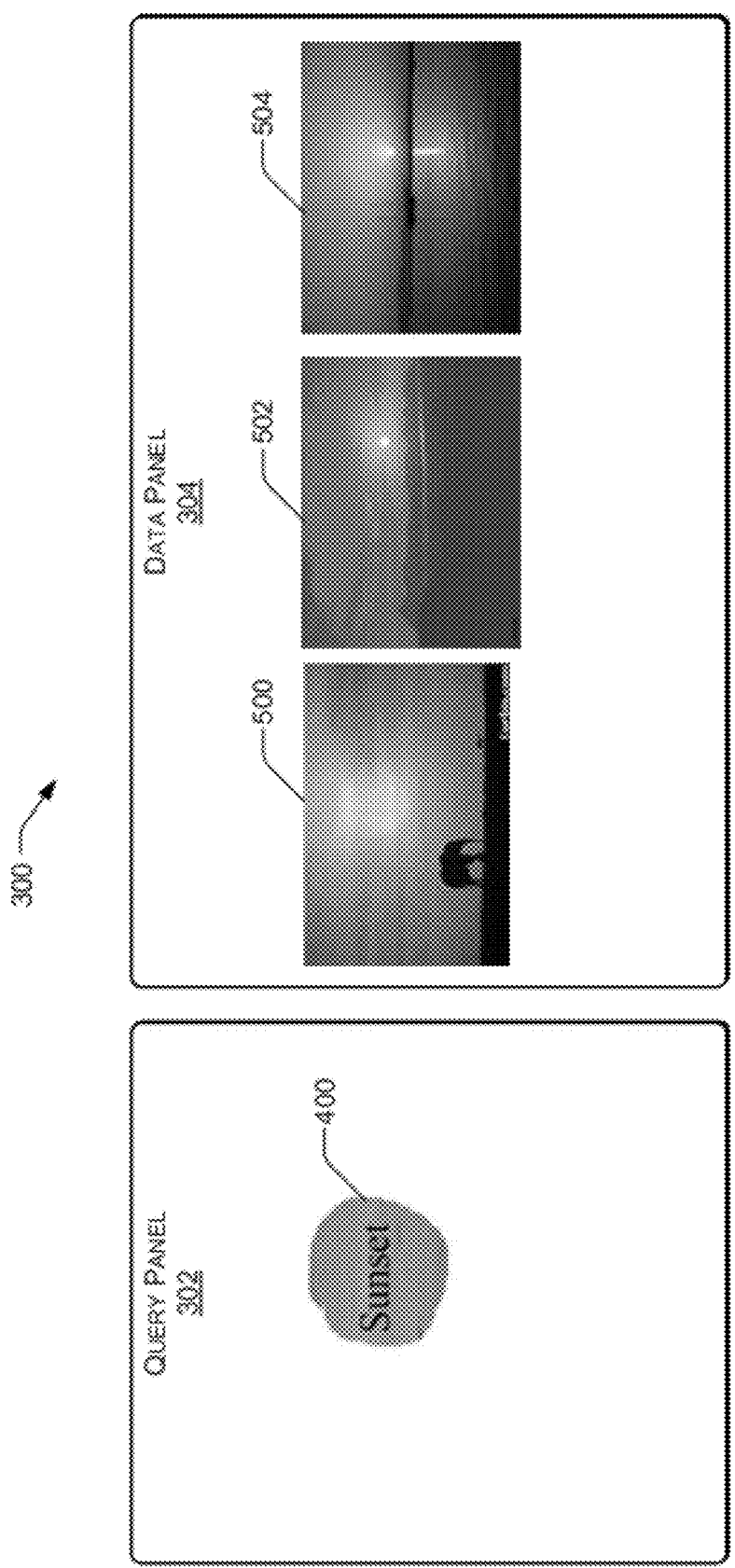
FIG. 5 depicts an example of a user interface with object spatial transformation and object-based image search input, and retrieved image results according to some implementations.

FIG. 5 illustrates an example of a user interface with object spatial transformation and object based image search input, and retrieved image results. If a user is not satisfied with the position or scale of an object in the query panel, the user can reposition or rescale the object. Also, the user can translate or rotate the object. Another option may be to remove the object.

In this example, the object 400 is repositioned in the query panel 400. The system returns more relevant images to data panel 304. In this example, the returned images with a "sun" or "sunset" object being in the same or proximate position as object 400 are images 500, 502, and 504. The images 500, 502, and 504, as in other returned image results, can be returned in real time.

Figure 6:
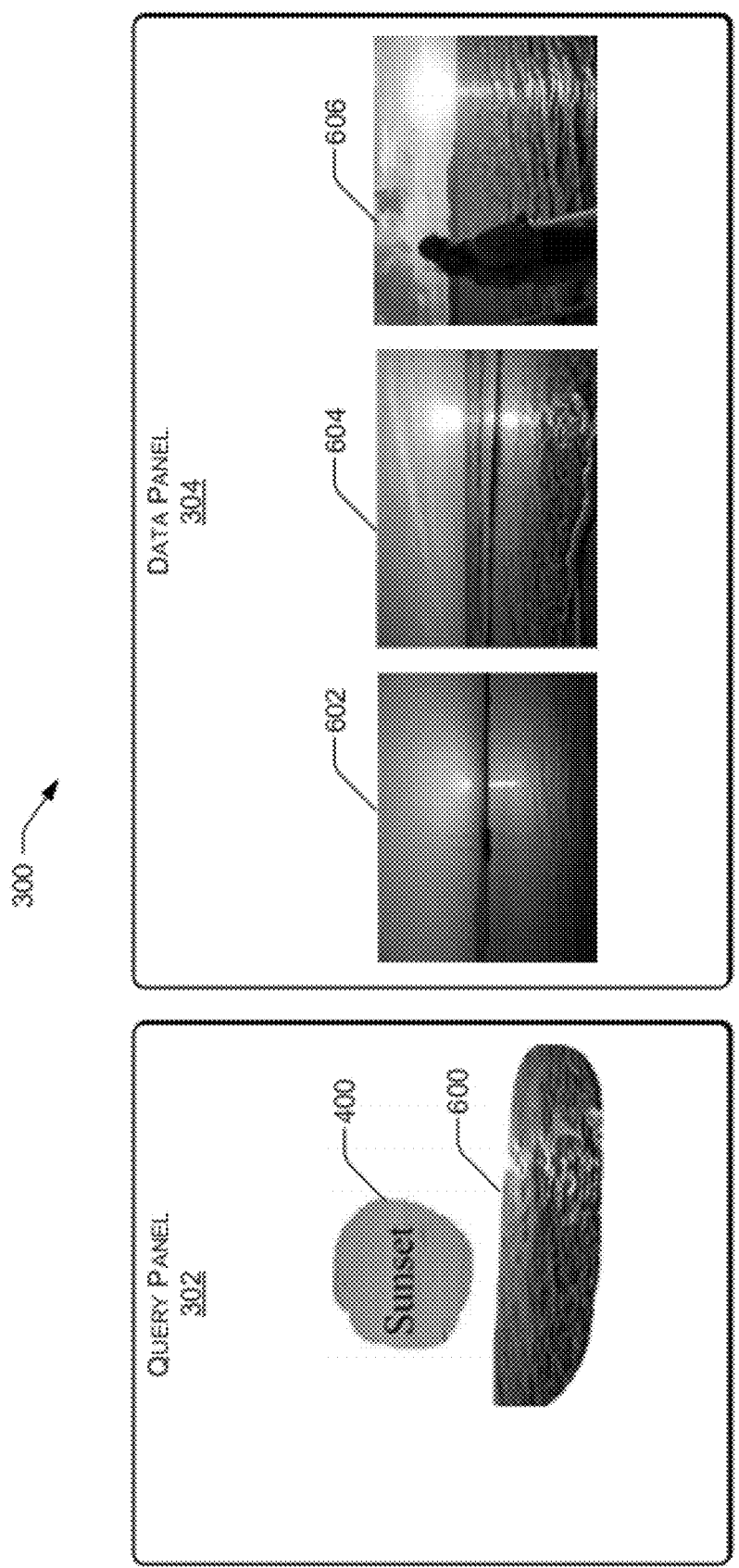
FIG. 6 depicts an example of a user interface with object drag-drop, spatial transformation, object-based image search input, and retrieved image results according to some implementations.

FIG. 6 illustrates an example of a user interface that with object drag-drop, spatial transformation, and object-based image search input, and retrieved image results. In certain cases, the user may desire to do a query search based on more than one object. The user may also find that a particular object in an image may be of interest. In this example, the user desires to find or perform a query search for images containing both a "sun" or "sunset" and a "sea" scene. In this case, the user can crop some part of the sea in a returned image (or other image), and drag and drop the selected part or object into the query panel 302. The selected object in this example is shown as object 600. As in other selected objects placed in query panel 302, the user has the option to rotate, rescale, position, and in general manipulate object 600 as the user desires. The system returns new or updated images based on the visual and spatial information of the two selected objects 400 and 600. In this example, the returned objects displayed on data panel 304 are objects 602, 604, and 606.

Figure 7:
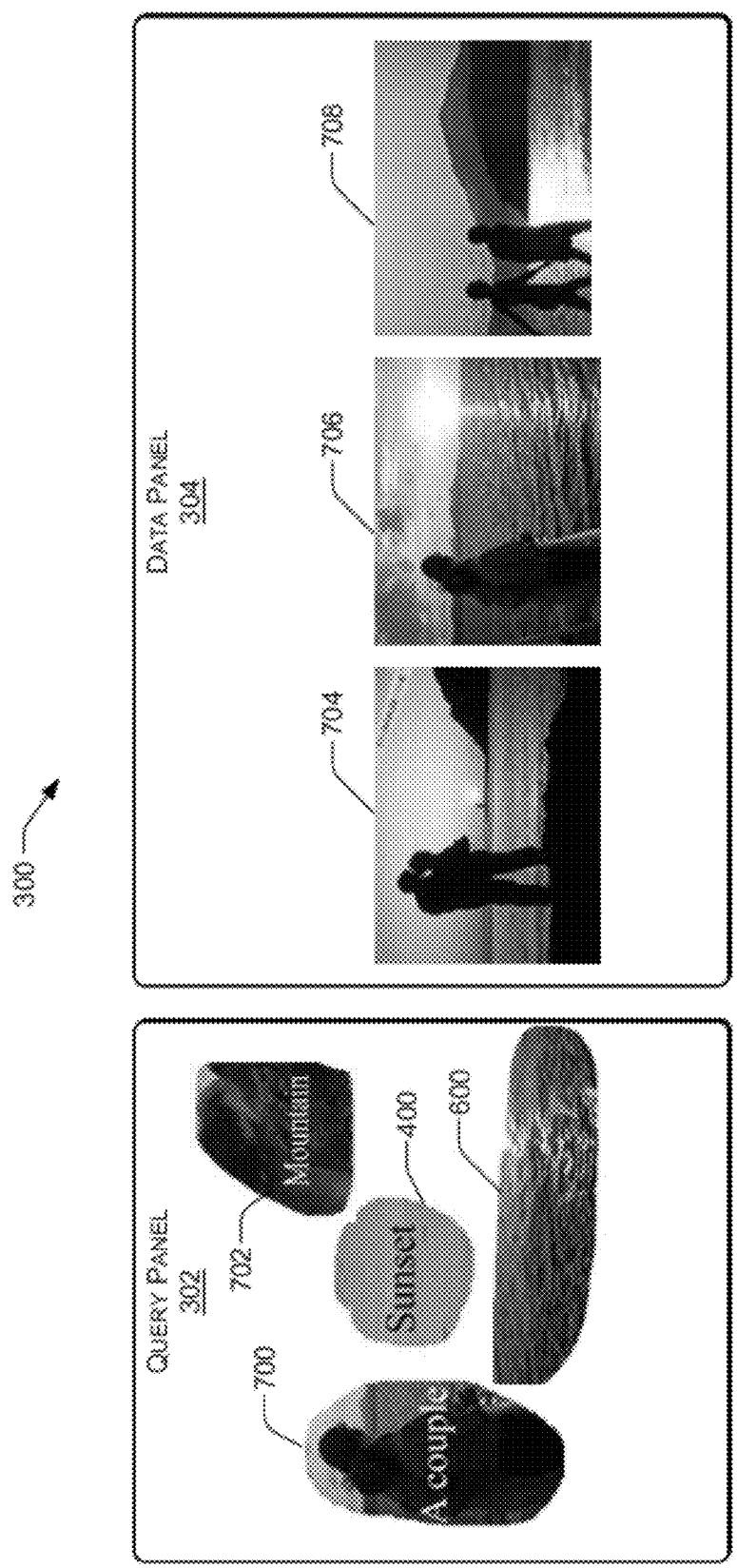
FIG. 7 depicts an example of a user interface that adds objects to a query panel and finds the most similar images to a query panel, and retrieved image results according to some implementations.

FIG. 7 illustrates an example of a user interface that adds objects to a query panel and finds the most similar images to the objects of the query panel, and retrieved image results. In certain cases, a user may desire to further refine the image query. In this example, the user is interested in finding images that also include a "couple" and "mountain." Such objects can be added to the query panel 302, as described above in reference to FIGS. 3-6. In this example, the added objects are "couple" object 700 and "mountain" object 702. The system returns new or updated images based on the visual and spatial information of the four selected objects 400, 600, 700 and 702. In this example, the returned objects displayed on data panel 304 are objects 704, 706, and 708.

Position Indexing of Object Patches

As discussed above, objects on images are indexed based on the position of the objects on the images. This allows query searches based on object position or spatial location of similar objects. Such indexing techniques are now described. An image is deconstructed into patches, where each patch can include object information. Therefore, an object may be made up of one or more patches.

Data Panel and Images Divided Into Patches

Figure 8:
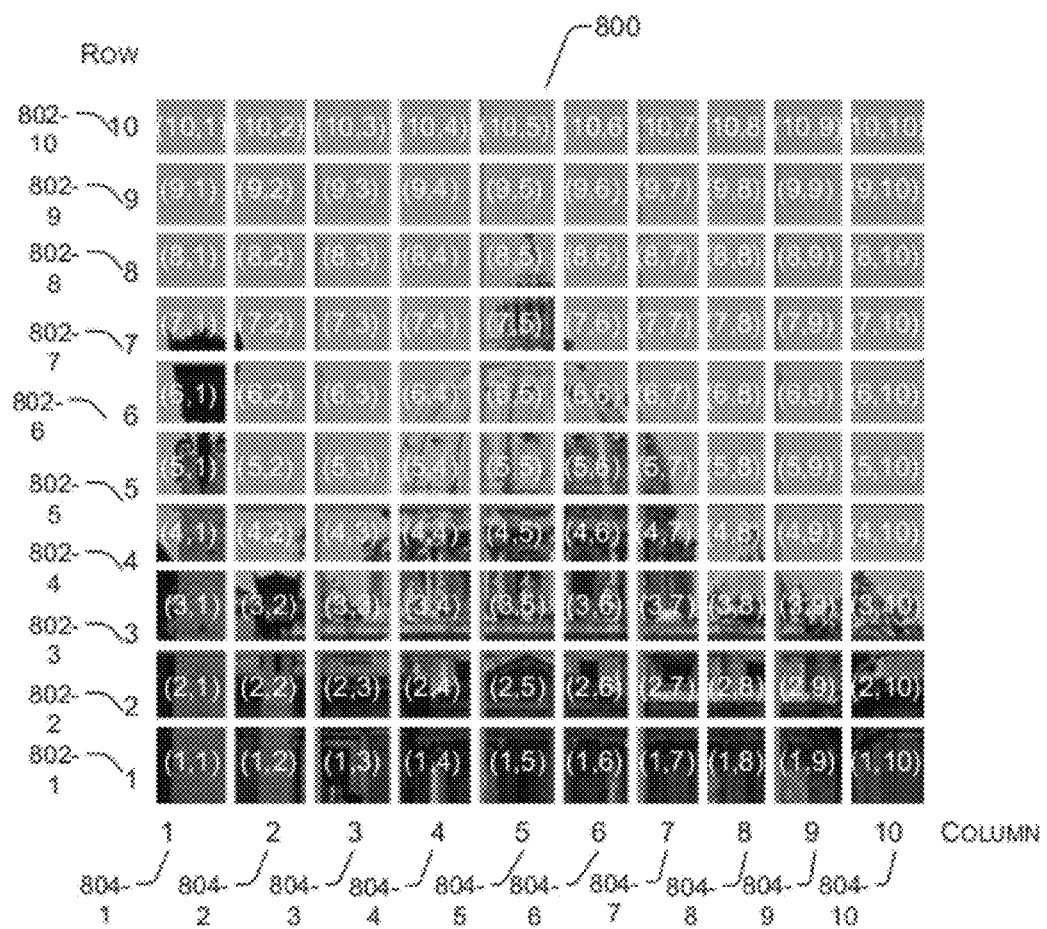
FIG. 8 depicts an image divided into a number of patches according to some implementations.

The data panel 302 and images in the images are divided into patches. In this example, the data panel 302 and images are uniformly divided into 10×10 patches or 100 patches. The patches are assigned a Cartesian {cx, cy} coordinate related to their position in the data panel 302. Therefore, positions on data panel 302 correlate with patch positions of images. FIG. 8 shows an example image 800 that is divided into 10×10 patches. The image is divided by 10 rows as represented by rows 802-1 to 802-10, and 10 columns as represented by columns 804-1 to 804-10.

For each patch, particular features may be extracted. In an implementation, three kinds of features are extracted. The three features include a 44 dimension correlogram, a 6 dimension color moment, and 14 dimension texture moment. Identified patches can easily number 750 patches for 10 million images, a relatively high number. The following describes a process as to indexing the patches, and use of the patch features.

Example Indexing Process

Figure 9:
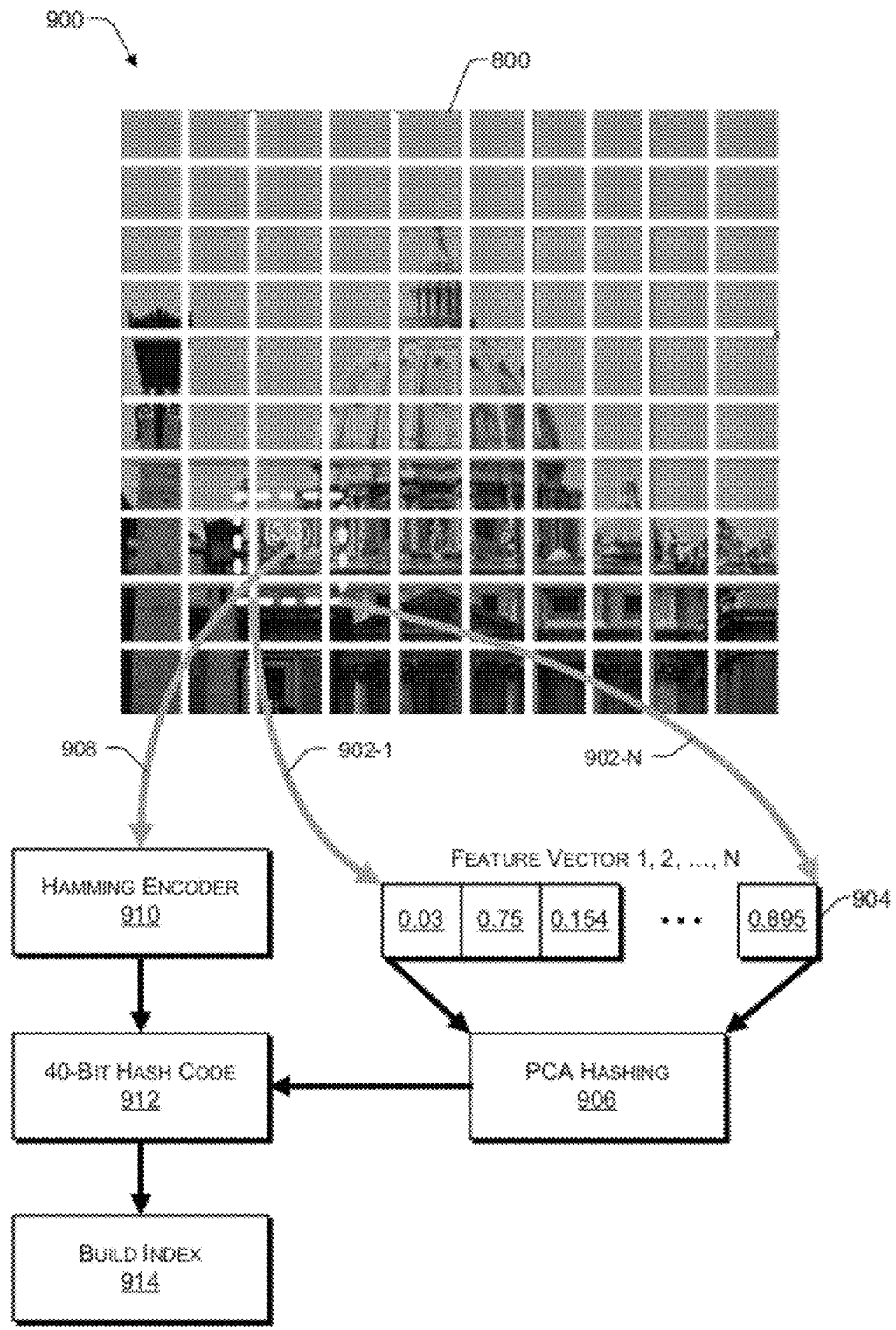
FIG. 9 is a block diagram of an indexing process according to some implementations.

FIG. 9 is an example of an indexing process 900 according to some implementations herein. Process 900 includes a local feature based multi-model algorithm. As discussed above, images are divided into patches (i.e., local patches). Also as discussed above, for each patch, features can be extracted, which are represented by 902-1 . . . 902-N. Example feature vectors 1, 2 to N, particular example values are represented by 904. The feature vectors 904 are hashed using a principal component analysis or PCA hashing 906, which will be further discussed below. Positions of the patches are encoded. In this example, the patch position has a coordinate value of {3, 3}. The position is extracted, as represented by 908 and provided to a hamming encoder 910. The position of the patch is encoded by the hamming encoder 910. The operation of the hamming encoder 910 is further discussed below. Both the PCA hashed vectors and the encoded position are processed using a 40-bit hash code 912. The hash code is further discussed below. An index can then be built 914, using the hashed coded patches.

Considering that the number of patches to search from can be extremely high, many indexing approaches cannot be used to index the patches. A compact indexing approach may be used, as described herein. In particular, an algorithm generates very compact and representative hash codes for patches, represented as PCA Hashing 910.

The PCA Hashing 910 algorithm can include the following. In certain implementations, a random sample is taken for 100,000 patches and a "k" dimension PCA model is trained. In one particular implementation, the value of "k" can be set to 32. A PCA matrix may be applied to reduce the dimensionality of all patch features in a database where such features are stored, to be "k" dimension. Each component of a "k" dimension feature can be quantized to be "1" if the component is no less than "0" (zero), otherwise the component is set to "0."

By this approach, each patch is quantized as a "k" bit 0-1 vector, which is referred to as a "hash code." Such an approach also can allow the dividing of feature space to fixed grids or quadrants. Patches in the same grid can be encoded by the same hash code. By performing PCA, an orthogonal subspace for the original feature space can be found. In subspace, image patches are symmetrically distributed around the axes (x, y), the axes being orthogonal to each other. Therefore, by such quantizing, it can be possible to get grids with almost equal number of patches in them. Such a property facilitates a hash algorithm and indexing algorithm.

Positional information of patches can be incorporated into the hash code (i.e., 40 bit hash code 912), by concatenating 8 bits to the hash code of each patch, in which 4 bit are code for x coordinate, and the other 4 bits are for y coordinate. These bits can be coded in by a Hamming code manner (i.e., hamming encoder 910). Therefore, if the Euclidean distance of two patches are larger than 2, their Hamming distances will be larger than 2. Therefore, by using a 40-bit hash code for each patch, the Hamming distances of hash codes of the patches can reflect both their visual similarities and spatial distances.

In order to provide efficient querying and searching, hash codes can be treated as a word as in text retrieval, from which an inverted index can be built (i.e., build index 914). It is contemplated that some variances can be tolerated with similar patches. For example, in order to tolerate such variances, for a hash code "h" (i.e., a word), patches having Hamming distances to "h" that are no larger than 3, are assigned to the inverted list of hash code "h". It is noted that, although two patches may be similar in terms of visual content, the two patches may be different in spatially (i.e., relative image position). Such images will be assigned to different lists. This provides that similar visual content images, having patches with different positions are not returned after the image query.

The following describes an example of an algorithm that relates the query panel 302 discussed above, with patches of images (e.g., of images 106). In this example, the value Q represents the query panel 302, and the value I represents an image in the database (e.g., images 106). The equation $Q_I=\{x_q\}$ denotes the set of patches that are partly or totally covered by the object regions in the query panel 302. The value $w_q$ is used to denote cover rate of patch $x_q$, where the cover rate is defined as the ratio of the area of the patch covered by the object region to that of the patch itself. The following relationship is set: $(x_q, I) = \max_{x_i \in I} \exp^{-\|x_q - x_i\|^2}$. In practice, the following can be applied, $x_q$ is used to retrieve the top k patches in the database. If all the patches of image I are not in the top k patches of $x_q$, the value of $s(x_q, I)$ will be set to be zero.

Similarity between the query panel 302 or Q, and the image I can be computed by the following equation (1):

$$\text{sim}(Q,I) = \Sigma_{x_q \in Q_I} w_q * s(x_q, I) + \beta \text{sim}_{tag}(Q,I) \quad (1)$$

where $\text{sim}_{tag}(Q,I)$ is the similarity between the tags labeled in the query panel 302 or Q, and the textual description of image I, in which cosine similarity is used. β is a trade-off parameter to balance the textual query and visual query. In practice, β can be set to very relatively large value in order to give the "textual" query a higher priority. The value sim(Q, I) can be used to rank images in the database (e.g., images 106) and return the top-ranked images in the data panel.

Example System

Figure 10:
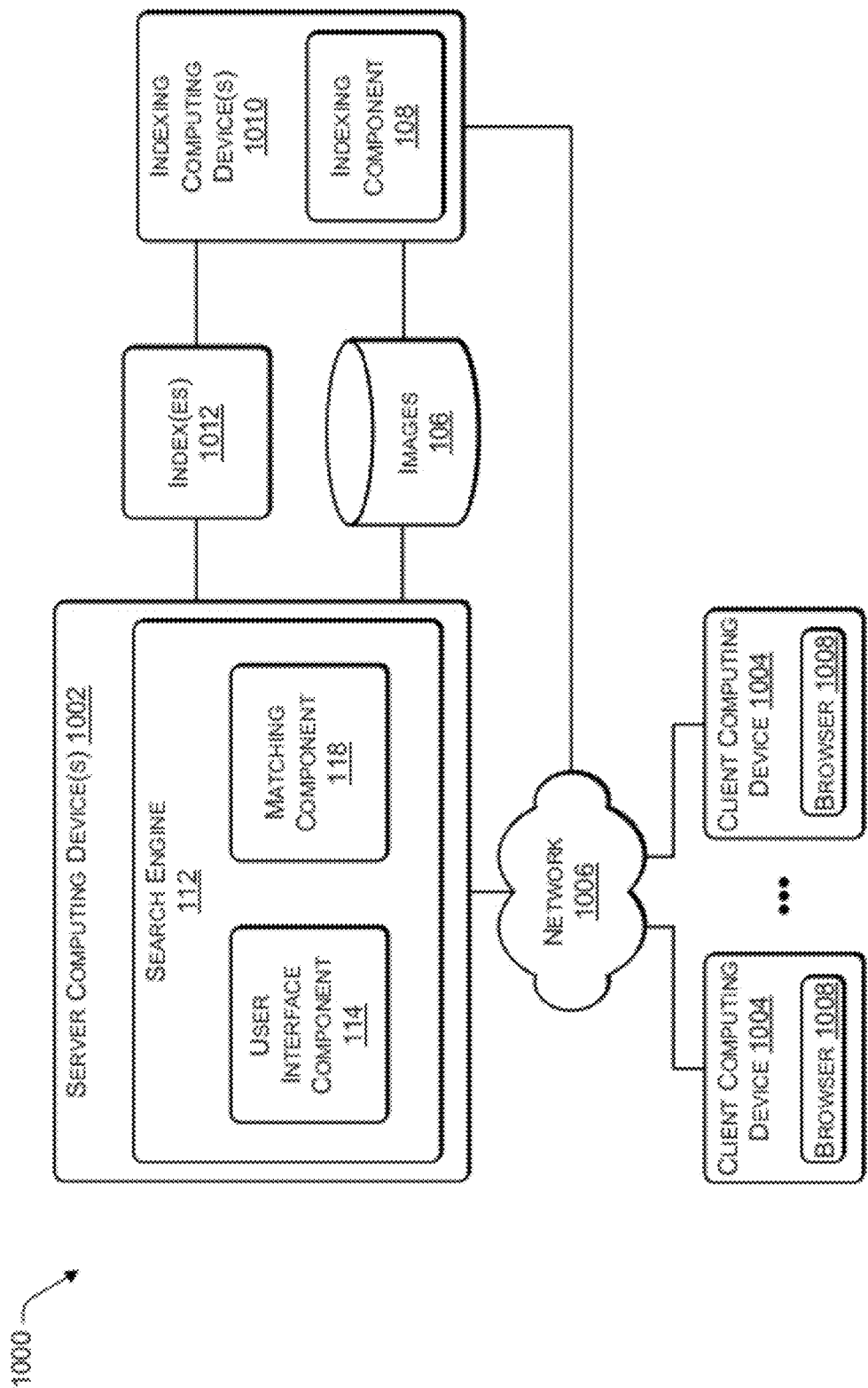
FIG. 10 is a block diagram of an example system for carrying out sketch and tagging based searching according to some implementations

FIG. 10 illustrates an example of a system 1000 for carrying out sketch and tagging based searching according to some implementations herein. To this end, the system 1000 includes one or more server computing device(s) 1002 in communication with a plurality of client or user computing devices 1004 through a network 1006 or other communication link. In some implementations, server computing device 1002 exists as a part of a data center, server farm, or the like, and is able to serve as a component for providing a commercial search website. The system 1000 can include any number of the server computing devices 1002 in communication with any number of client computing devices 1004. For example, in one implementation, network 1006 includes the World Wide Web implemented on the Internet, including numerous databases, servers, personal computers (PCs), workstations, terminals, mobile devices and other computing devices spread throughout the world and able to communicate with one another. Alternatively, in another possible implementation, the network 1006 can include just a single server computing device 1002 in communication with one or more client devices 1004 via a LAN (local area network) or a WAN (wide area network). Thus, the client computing devices 1004 can be coupled to the server computing device 1002 in various combinations through a wired and/or wireless network 1006, including a LAN, WAN, or any other networking technology, using one or more protocols, for example, a transmission control protocol running over Internet protocol (TCP/IP), or other suitable protocols.

In some implementations, client computing devices 1004 are personal computers, workstations, terminals, mobile computing devices, PDAs (personal digital assistants), cell phones, smart phones, laptops, tablet computing devices, or other computing devices having data processing capability. Furthermore, client computing devices 1004 may include a browser 1008 for communicating with server computing device 1002, such as for presenting the user interface herein to a user and for submitting a search query to the server computing device 1002. Browser 1008 may be any suitable type of web browser such as Internet Explorer®, Firefox®, Chrome®, Safari®, or other type of software configured to enable submission of a sketch-based query for a search as disclosed herein.

In addition, server computing device 1002 may include search engine 112 for responding to sketch-based search queries received from client computing devices 1004. Accordingly, in some implementations, search engine 112 may include user interface component 114 and matching component 118, as described above, for receiving sketch and tagging based queries and/or text queries. In some implementations, user interface component 114 may provide the user interface described herein as a webpage able to be viewed and interacted with by the client computing devices through browsers 1008. In other implementations, browsers 1008 may have an add-in or similar user interface component for generating the user interface 300 disclosed herein. Other variations will also be apparent in view of the disclosure herein.

Additionally, one or more indexing computing devices 1010 having indexing component 108 may be provided for carrying out the indexing stage 102 disclosed herein. In some implementations, indexing computing device 1010 may be the same computing device as server computing device 1002; however, in other implementations, indexing computing device(s) 1010 may be part of an offline web crawling search facility that indexes images available on the Internet. Thus, in some implementations images 106 are stored multiple websites on the Internet. In other implementations, images 106 are stored in a database accessible by server computing device 1002 and/or indexing computing device 1008. As discussed above, indexing component 108 generates one or more indexes 1012 for the images 106, such as the image index 110 for sketch and tagging based search of the images 106.

Furthermore, while an example system architecture is illustrated in FIG. 10, other suitable architectures may also be used, and that implementations herein are not limited to any particular architecture. For example, in some implementations, indexing component 108 may be located at server computing device 1002, and indexing computing device 1010 may be eliminated. Other variations will also be apparent to those of skill in the art in light of the disclosure herein.

Example Server Computing Device

Figure 11:
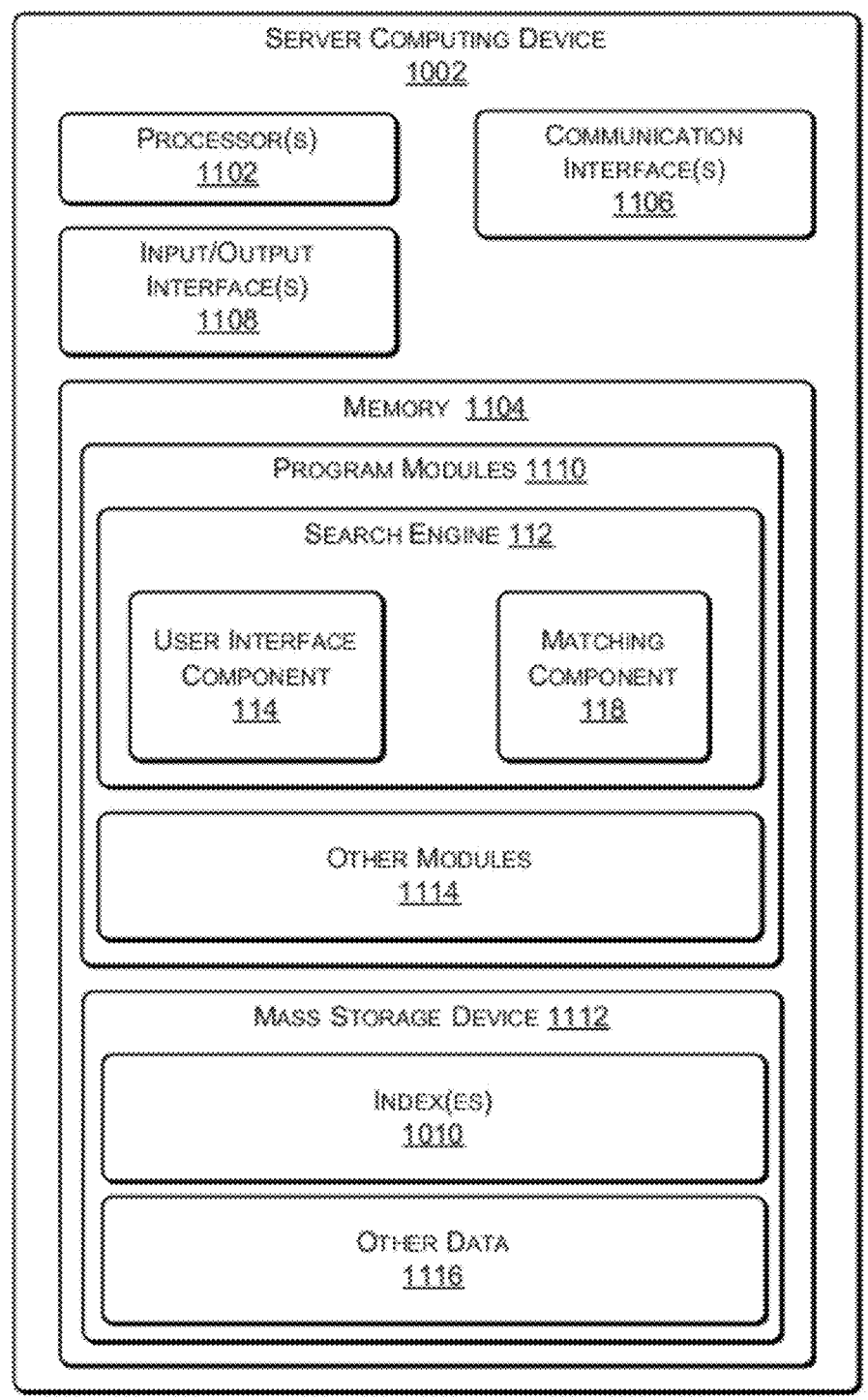
FIG. 11 is a block diagram of an example server computing device according to some implementations.

FIG. 11 illustrates an example configuration of a suitable computing system environment for server computing device 1002 and/or indexing computing device 1010 according to some implementations herein. Thus, while the server computing device 1002 is illustrated, the indexing computing device 1010 may be similarly configured. Server computing device 1002 may include at least one processor 1102, a memory 1104, communication interfaces 1106 and input/output interfaces 1108.

The processor 1102 may be a single processing unit or a number of processing units, all of which may include single or multiple computing units or multiple cores. The processor 1102 can be implemented as one or more microprocessors, microcomputers, microcontrollers, digital signal processors, central processing units, state machines, logic circuitries, and/or any devices that manipulate signals based on operational instructions. Among other capabilities, the processor 1102 can be configured to fetch and execute computer-readable instructions or processor-accessible instructions stored in the memory 1104, mass storage device 1112, or other computer-readable storage media.

Memory 1104 is an example of computer-readable storage media for storing instructions which are executed by the processor 1102 to perform the various functions described above. For example, memory 1104 may generally include both volatile memory and non-volatile memory (e.g., RAM, ROM, or the like). Further, memory 1104 may also include mass storage devices, such as hard disk drives, solid-state drives, removable media, including external and removable drives, memory cards, Flash memory, floppy disks, optical disks (e.g., CD, DVD), storage arrays, storage area networks, network attached storage, or the like, or any combination thereof. Memory 1104 is capable of storing computer-readable, processor-executable program instructions as computer program code that can be executed on the processor(s) 1102 as a particular machine configured for carrying out the operations and functions described in the implementations herein.

Memory 1104 may include program modules 1110 and data 1112. Program modules 1110 may include the search engine 112 and other modules 1114, such as an operating system, drivers, and the like. As described above, search engine 112 may include the user interface component 114 and the matching component 118, which can be executed on the processor(s) 1102 for implementing the functions described herein. In some implementations, memory 1104 may also include the indexing component 108 for carrying out the indexing functions herein, but in other implementations, indexing component 108 is executed on a separate indexing computing device. Additionally, data 1112 may include the indexes 1010, such as the image index 110. Data 1112 may also include other data 1116 for use in server operations, such as data for providing a search website, and so forth.

The server computing device 1002 can also include one or more communication interfaces 1106 for exchanging data with other devices, such as via a network, direct connection, or the like, as discussed above. The communication interfaces 1806 can facilitate communications within a wide variety of networks and protocol types, including wired networks (e.g., LAN, cable, etc.) and wireless networks (e.g., WLAN, cellular, satellite, etc.), the Internet and the like.

Example Client Computing Device

Figure 12:
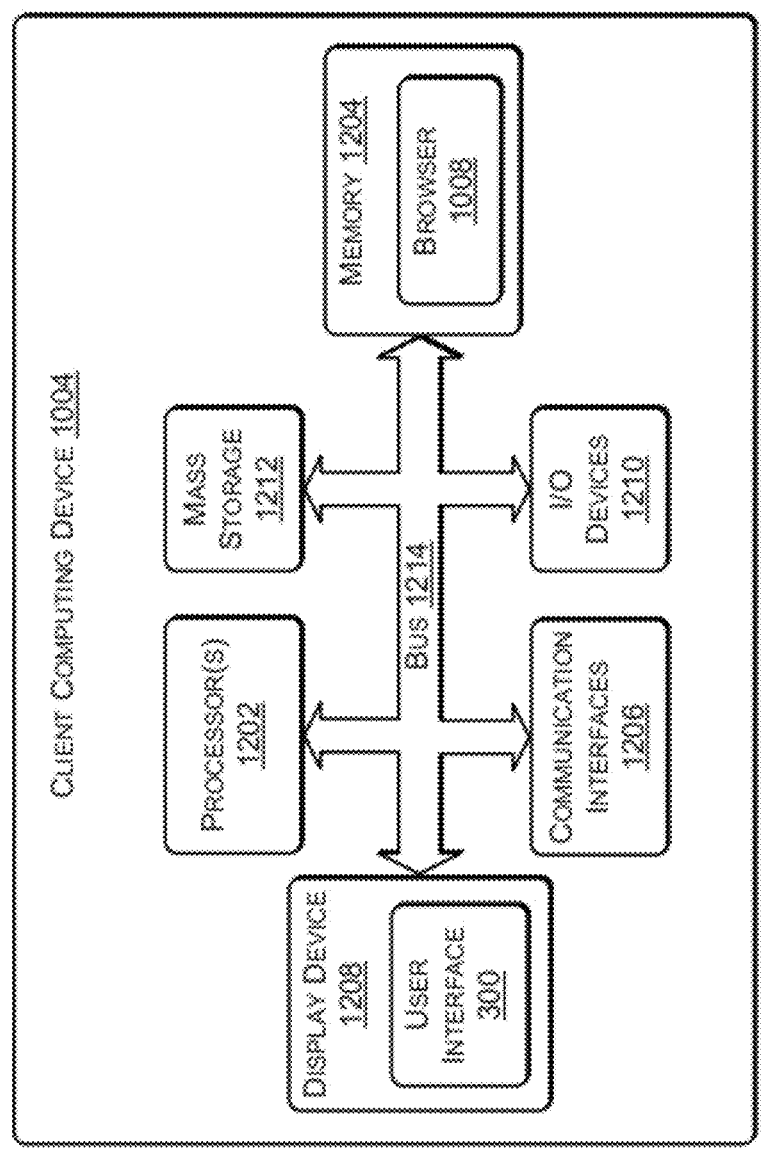
FIG. 12 is a block diagram of an example client computing device according to some implementations.

FIG. 12 illustrates an example configuration of a suitable computing system environment for client computing device 1004 according to some implementations herein. The client computing device 1004 may include at least one processor(s) 1202, a memory 1204, communication interfaces 1206, a display device 1208, input/output (I/O) devices 1210, and one or more mass storage devices 1212, all able to communicate through a system bus 1214 or other suitable connection.

The processor(s) 1202 may be a single processing unit or a number of processing units, all of which may include single or multiple computing units or multiple cores. The processor(s) 1202 can be implemented as one or more microprocessors, microcomputers, microcontrollers, digital signal processors, central processing units, state machines, logic circuitries, and/or any devices that manipulate signals based on operational instructions. Among other capabilities, the processor(s) 1202 can be configured to fetch and execute computer-readable instructions or processor-accessible instructions stored in the memory 1204, mass storage devices 1212, or other computer-readable storage media.

Memory 1204 and mass storage device 1212 are examples of computer-readable storage media for storing instructions which are executed by the processor 1202 to perform the various functions described above. For example, memory 1204 may generally include both volatile memory and non-volatile memory (e.g., RAM, ROM, or the like). Further, mass storage device 1212 may generally include hard disk drives, solid-state drives, removable media, including external and removable drives, memory cards, Flash memory, floppy disks, optical disks (e.g., CD, DVD), storage arrays, storage area networks, network attached storage, or the like, or any combination thereof. Both memory 1204 and mass storage device 1212 may be collectively referred to as memory or computer-readable storage media herein. Memory 1204 is capable of storing computer-readable, processor-executable program instructions as computer program code that can be executed on the processor 1202 as a particular machine configured for carrying out the operations and functions described in the implementations herein. Memory 1204 may include browser 1008 for enabling a user to submit a sketch and tagging based query. For example, browser 1008 may display user interface 300 as a web page on display device 1208 for receiving search queries, as described above. Alternatively, in other implementations, memory 1204 may include at least a portion of user interface component 114 for generating the user interface 300 on display device 1208.

The client computing device 1004 can also include one or more communication interfaces 1206 for exchanging data with other devices, such as via a network, direct connection, or the like, as discussed above. The communication interfaces 1206 can facilitate communications within a wide variety of networks and protocol types, including wired networks (e.g., LAN, cable, etc.) and wireless networks (e.g., WLAN, cellular, satellite, etc.), the Internet and the like.

The display device 1208, such as a monitor, display, or touch screen, may be included in some implementations for displaying the user interface 300 and/or an input image to a user. I/O devices 1210 may include devices that receive various inputs from a user and provide various outputs to the user, such as a keyboard, remote controller, a mouse, a camera, audio devices, and so forth. In the case in which display device 1208 is a touchscreen, the display device 1208 can act as input device for submitting queries, as well as an output device for displaying results.

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or applications, and may be implemented in general purpose and special-purpose computing systems, or other devices having processing capability.

Additionally, the components, frameworks and processes herein can be employed in many different environments and situations. Generally, any of the functions described with reference to the figures can be implemented using software, hardware (e.g., fixed logic circuitry) or a combination of these implementations. The term "engine," "mechanism" or "component" as used herein generally represents software, hardware, or a combination of software and hardware that can be configured to implement prescribed functions. For instance, in the case of a software implementation, the term "engine," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices or media. Thus, the processes, components and modules described herein may be implemented by a computer program product.

Although illustrated in FIG. 11 as being stored in memory 1104 of server computing device 1002, search engine 112 and indexing component 108, or portions thereof, may be implemented using any form of computer-readable media that is accessible by server computing device 1002 and/or indexing computing device 1010. Computer-readable media may include, for example, computer storage media and communications media. Computer storage media is configured to store data on a non-transitory tangible medium, while communications media is not.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Example Search Process

Figure 13:
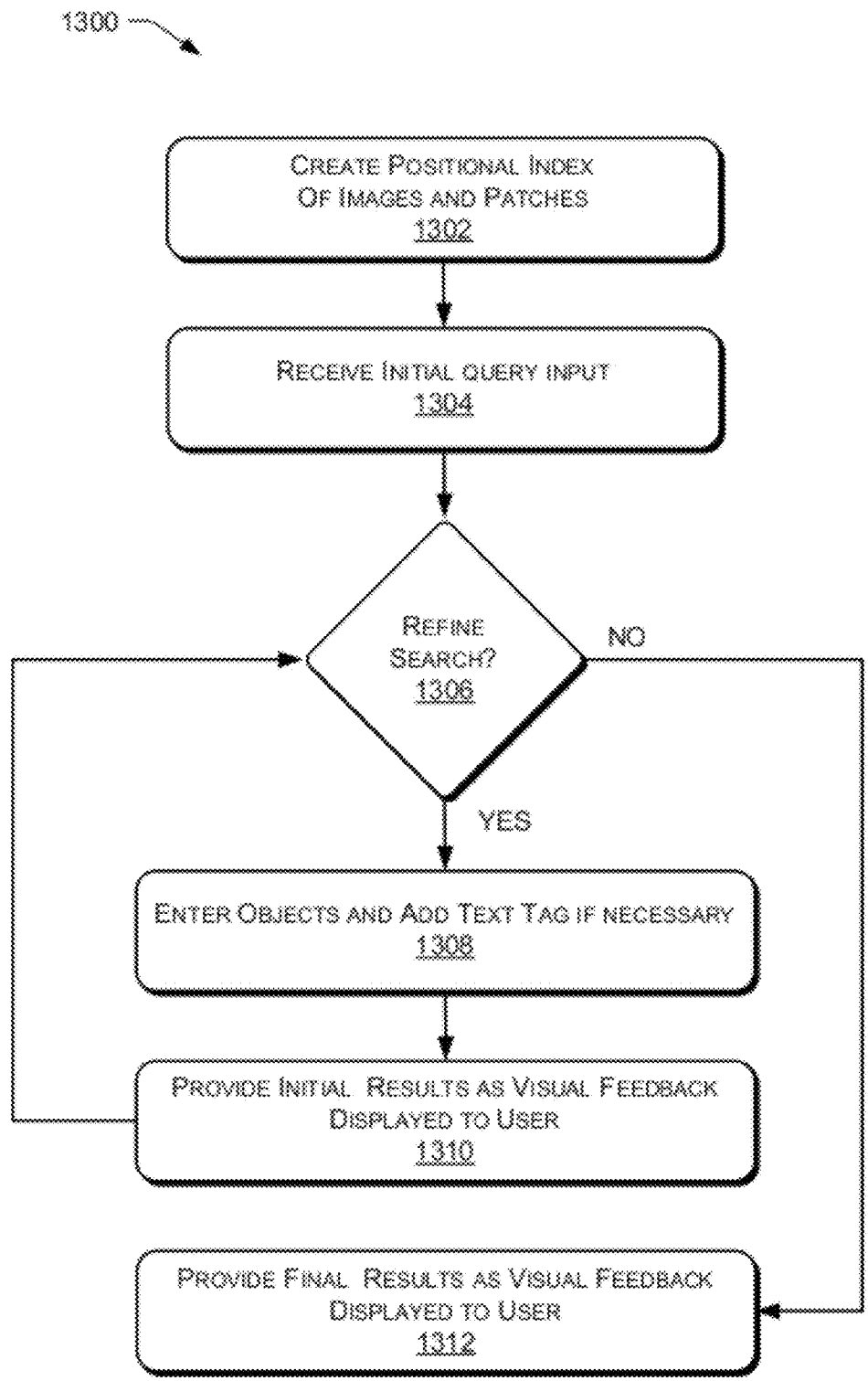
FIG. 13 is a flow diagram of an example process for sketch and tagging searching according to some implementations.

FIG. 13 depicts a flow diagram of an example of a sketch-based image search process according to some implementations herein. In the flow diagram, the operations are summarized in individual blocks. The operations may be performed in hardware, or as processor-executable instructions (software or firmware) that may be executed by one or more processors. Further, the process 1300 may, but need not necessarily, be implemented using the framework of FIG. 5, and process of FIG. 9.

At block 1302, an index of images and patches is created. The indexing can be of individual patches, based on their positions in an image. Such an indexing can be performed by the process as described in FIG. 9. Each patch can have both positional and feature elements in which the index is based. The images can be images from one or resources, as described above.

At block 1304, an initial query input is received from a user. For example, the query input may include any combination of a sketch query input, a text tagged query input, and/or a combined sketch and text tagged query input. The query input can be directed to an object or objects. Such object(s) can be related to particular patches of images, which are indexed in block 1302. The query can be performed using the query panel 302 of the user interface 300 described above.

If a user decides to refine the search, and perform another iteration (i.e., iterative searching), the YES branch of block 1306 is followed. If the user decides that the search does not have to be refined, the NO branch of block 1306 is followed.

At block 1308, the user can enter objects and add text tags to the objects as desired. The objects may be sketched out by the user. The user can also use a lasso, drag and drop operation on an image to chose and enter objects. Particular objects can be tagged with a text.

At block 1310, initial results are returned to the user. The results are based on the query of the user. The results are based on the sketches and objects, are tagged or not tagged, as presented by the user. The returned images are particularly based on similar features and positions of the query sketches and objects provided by the user. The returned images can be ranked as to relevancy or similarity to the sketches and objects. The returned images can be presented using the data panel 304 of user interface 300 described above. The images can be provided in real time, allowing the user to determine whether to refine the query or search.

A determination can further be made whether the search is to be refined, at block 1306. If the search will not be refined, following the NO branch of block 1306, then block 1312 can be performed.

At block 1312, final results are provided to the user as visual feedback. The returned images can be ranked as to relevancy or similarity to the tagged or untagged sketches and objects provided by the user. The returned images can be presented using the data panel 304 of user interface 300 described above. The returned images can be provided in real time to the user.

Accordingly, implementations herein provide for sketch-based image search with efficient curve matching and scalable indexing. The sketch and tagged based image search system herein enables real-time interactive sketch-to-image matching and significantly outperforms existing query systems. Furthermore, implementations herein provide indexing techniques to enable indexing of huge quantities of images for sketch and tagged based image search Implementations herein also support object level query inputs including sketch, and text tagging so that users can more precisely formulate their query intentions. Experimental results on different search tasks have shown the effectiveness and efficiency of the proposed framework.

CONCLUSION

Implementations herein provide an interactive real time sketch and tagged based search system. Further, some implementations enable positional indexing of patches of huge quantities of images. Additionally, some implementations provide a user interface that allows users to flexibly formulate queries using any combination of object level sketch inputs, and text tagging inputs.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A system comprising:
a processor in communication with computer-readable storage media;
an index maintained in the computer-readable storage media, the index comprising hash-coded patches of a plurality images that are indexed based on positions of the hash-coded patches of the images, the index including positional information of patches, the positional information of patches incorporated into the hash-coded patches;
a user interface component including a query panel to receive a query sketch of at least one object representing at least one patch in the index of the hash-coded patches; and
a matching component, maintained in the computer-readable storage media and executed on the processor, for matching the images to the query sketch, and identifying at least one matching image of the plurality of images, the matching based at least on the index of the hash-coded patches, the matching component further based on a position of the at least one object within the query panel of the user interface and the positional information of the hash-coded patches.

2. The system of claim 1, wherein the index further includes feature vectors of the hash-coded patches.

3. The system of claim 1, wherein the index further includes feature vectors of the hash-coded patches.

4. The system of claim 1, wherein the query sketch includes curves.

5. The system of claim 1, wherein the matching component provides an iterative sketch and tag search to a user.

6. The system of claim 1, wherein the at least one object is an image portion selected from another image.

7. The system of claim 1, wherein:
the query panel is further configured to receive a text tag of the object; and
the matching component is further configured to match images to the text tag, and the matching component is further based at least on a text-based image search.

8. A computer-implemented method performed by a computing device comprising:
receiving a query sketch of at least one object;
identifying one or more images in a database that include one or more patches in an index of hash-coded patches that correspond to the at least one object, wherein the hash-coded patches are indexed by features and position in the images, the index including positional information of the patches incorporated into the hash-coded patches, the identifying further based on a position of the at least one object within a query panel of a user interface and the positional information of the hash-coded patches; and
providing the one or more identified images in response to the query sketch.

9. The method of claim 8, wherein the receiving the query sketch includes an initial query input.

10. The method of claim 8, further comprising:
receiving input modifying the query sketch subsequent to the providing the one or more identified images; and
providing one or more additional identified objects in response to the modified query sketch.

11. The method of claim 8, wherein the identifying includes searching similar hash-coded patches.

12. The method of claim 8, wherein the identifying includes searching images from one or more resources having indexed images.

13. The method of claim 8, wherein the providing includes ranking the identified images.

14. The method of claim 8, wherein the providing includes initial images provided in response to an initial query sketch and final images provided in response to a modified query sketch.

15. The computer-implemented method of claim 8, further comprising receiving a text tag of the at least one object within the query sketch, and wherein the identifying one or more images in the database includes identifying images that match the text tag of the at least one object.

16. A computer-implemented method performed by a computing device comprising:

creating an index having a plurality of hash-coded patches representing one or more objects in a plurality of images, the plurality of hash-coded patches indexed based on position of patches within the plurality of images, the index including positional information of the patches incorporated into the hash-coded patches;

accessing one or more images of the plurality of images based on a sketch query input into a query panel of a user interface, the sketch query including one or more objects, the accessing further based on relative positions of the one or more objects within a query panel of the user interface and the positional information of the hash-coded patches; and presenting the one or more images.

17. The computer-implemented method of claim 16, wherein the plurality of hash-coded patches are further indexed based on feature vectors of the patches.

18. The method of claim 16, where the presenting includes ranked images.

19. The method of claim 16, wherein at least one of the one or more objects is an image portion taken from another image.

20. The computer-implemented method of claim 16, wherein the accessing is further based on text tags of the sketch query.

* * * * *